(12) United States Patent
Kwon

(10) Patent No.: US 12,512,689 B2
(45) Date of Patent: Dec. 30, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Mun Soon Kwon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 186 days.

(21) Appl. No.: 17/967,093

(22) Filed: Oct. 17, 2022

(65) Prior Publication Data

US 2023/0132873 A1 May 4, 2023

(30) Foreign Application Priority Data

Nov. 2, 2021 (KR) .................. 10-2021-0148849

(51) Int. Cl.
*H02J 7/00* (2006.01)
*B60R 16/03* (2006.01)

(52) U.S. Cl.
CPC ......... *H02J 7/00712* (2020.01); *B60R 16/03* (2013.01); *H02J 7/0047* (2013.01); *H02J 7/0063* (2013.01)

(58) Field of Classification Search
CPC .... H02J 7/00712; H02J 7/0047; H02J 7/0063; H02J 2310/46; H02J 1/14; B60R 16/03; B60R 16/033; B60R 16/023
USPC ................................................. 307/9.1–10.1
See application file for complete search history.

(56) References Cited

U.S. PATENT DOCUMENTS

| | | | |
|---|---|---|---|
| 11,764,579 B1* | 9/2023 | Cooper ..................... | H02J 3/14 307/29 |
| 2004/0155624 A1* | 8/2004 | Amano ..................... | H02J 1/14 320/104 |
| 2009/0261796 A1* | 10/2009 | Ito ........................ | H02M 3/1582 323/285 |
| 2012/0041621 A1* | 2/2012 | Marus ..................... | B60L 1/003 701/22 |
| 2015/0375626 A1* | 12/2015 | Hachiya ................... | B60L 53/11 307/10.1 |
| 2016/0059807 A1* | 3/2016 | Iwasaki ................... | B60R 16/03 307/10.1 |
| 2016/0118830 A1* | 4/2016 | Jeon ....................... | B60L 58/22 320/127 |
| 2017/0194673 A1* | 7/2017 | Jeon ....................... | H04Q 9/00 |
| 2020/0389012 A1* | 12/2020 | Nakamura ............. | H02H 7/226 |
| 2020/0403409 A1* | 12/2020 | Nakamura ................ | H02J 7/35 |

* cited by examiner

*Primary Examiner* — Rexford N Barnie
*Assistant Examiner* — Terrence R Willoughby
(74) *Attorney, Agent, or Firm* — Morgan, Lewis & Bockius LLP

(57) ABSTRACT

A vehicle includes: a plurality of electronic devices including a first electronic device and a second electronic device; a plurality of control units configured to control power supplied to the plurality of electronic devices; and a main control unit configured to provide a plurality of control signals to the plurality of control units, in which the main control unit is further configured to determine required power of the plurality of electronic devices based on input signals provided from the plurality of control units and to generate the plurality of control signals for changing at least one of an output voltage of the first electronic device or an output voltage of the second electronic device, based on the determined required power.

11 Claims, 17 Drawing Sheets

FIG. 7

| CATEGORY | FIRST CONTROL | SECOND CONTROL | THIRD CONTROL | NOTES |
|---|---|---|---|---|
| HIGH VOLTAGE LOAD | 70% | 50% | 30% | 70%→50%→30% |
| LOW VOLTAGE LOAD | LOW | MEDIUM | HIGH | LOW→MEDIUM→HIGH |
| FUEL EFFICIENCY | NO CHANGE IN FUEL EFFICIENCY | FUEL EFFICIENCY IMPROVEMENT ↑ | SIGNIFICANT FUEL EFFICIENCY IMPROVEMENT ↑ | OVERALL POWER CONSUMPTION IS REDUCED BECAUSE HIGH VOLTAGE POWER REDUCTION IS RELATIVELY LARGER THAN LOW VOLTAGE POWER INCREASE |

FIG. 17
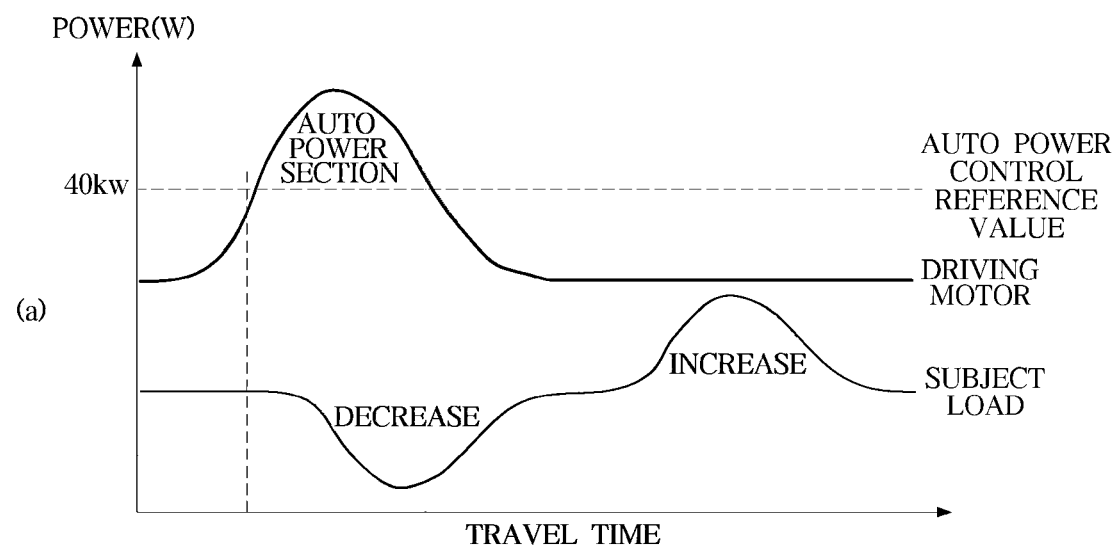
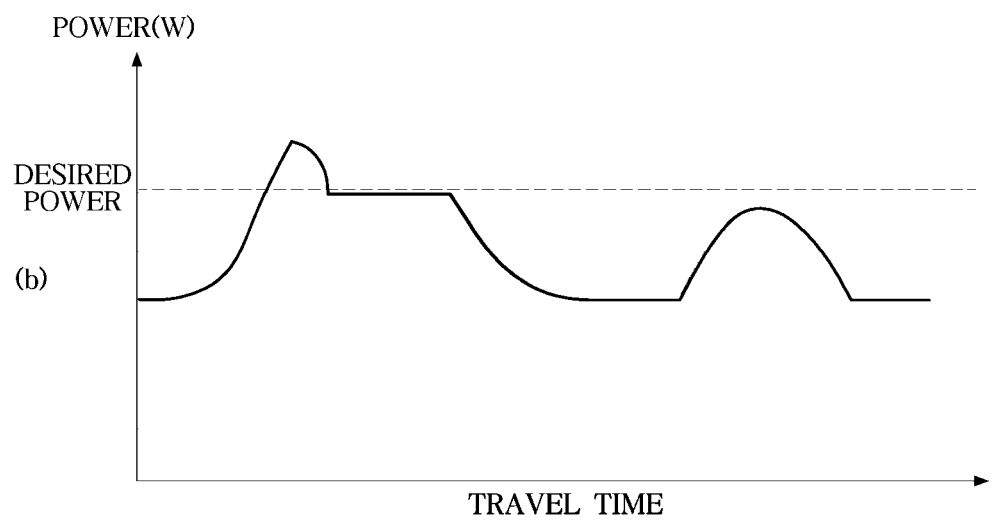

VEHICLE AND CONTROL METHOD THEREOF

CROSS-REFERENCE TO RELATED APPLICATION

This application is based on and claims priority under 35 U.S.C. § 119 to Korean Patent Application No. 10-2021-0148849, filed on Nov. 2, 2021 in the Korean Intellectual Property Office, the disclosure of which is incorporated herein by reference.

TECHNICAL FIELD

The disclosure relates to a vehicle and a control method thereof, and more particularly, to a vehicle and a control method thereof that manages power of an electronic control device.

BACKGROUND

A vehicle provides various functions for user convenience in addition to a basic function such as driving. To this end, a vehicle is equipped with a variety of electronic devices, and includes an electronic control unit (ECU) for controlling the electronic devices.

The above electronic devices may be divided into a high voltage load or a low voltage load. The electronic devices that require high voltage include an electric compressor, an air conditioning heater, and the like, and the electronic devices that require low voltage include a seat heating device, a seat ventilation device, and the like.

Conventionally, a method of transmitting power is fixed since a high voltage load or a low voltage load are individually controlled, and thus a minimum power consumption in an eco mode is fixed.

SUMMARY

An aspect of the disclosure provides a vehicle and a control method thereof that may control output values of a high voltage load and a low voltage load in various ways through integrated control of electronic control units (ECU).

According to an embodiment of the disclosure, a vehicle includes: a plurality of electronic devices including a first electronic device and a second electronic device; a plurality of control units configured to control power supplied to the plurality of electronic devices; and a main control unit configured to provide a plurality of control signals to the plurality of control units, wherein the main control unit is further configured to determine required power of the plurality of electronic devices based on input signals provided from the plurality of control units and to generate the plurality of control signals for changing at least one of an output voltage of the first electronic device or an output voltage of the second electronic device, based on the determined required power.

The plurality of electronic devices include the first electronic device which is a high voltage load and the second electronic device which is a low voltage load.

The main control unit is configured to reduce the output voltage of the first electronic device according to a predetermined rate, and to increase the output voltage of the second electronic device according to a predetermined voltage level.

The first electronic device includes an air conditioning heater, and the second electronic device includes at least one of a heating wire or an infrared warmer.

The main control unit is further configured to generate the plurality of control signals in response to a user's selection input or detection of peak power of the vehicle.

The vehicle further including: a battery configured to supply power to the plurality of electronic devices; and a battery management system (BMS) configured to monitor the power supplied from the battery, wherein the main control unit is further configured to reduce at least one of the output voltage of the first electronic device or the output voltage of the second electronic device in response to receiving a peak power signal from the BMS.

When a first peak power signal, indicating that a first peak power is detected, and a second peak power signal, generated when a second peak power is detected after the first peak power signal, are received from the BMS, the main control unit is further configured to reduce at least one of the output voltage of the first electronic device or the output voltage of the second electronic device according to a reduction control corresponding to the first peak power signal and a reduction control corresponding to the second peak power signal.

According to an embodiment of the disclosure, a control method of a vehicle including a plurality of electronic devices including a first electronic device and a second electronic device, a plurality of control units configured to control power supplied to the plurality of electronic devices, and a main control unit configured to provide a plurality of control signals to the plurality of control units, includes: determining, by the main control unit, required power of the plurality of electronic devices based on input signals provided from the plurality of control units; and generating, by the main control unit, the plurality of control signals for changing at least one of an output voltage of the first electronic device or an output voltage of the second electronic device, based on the determined required power.

The plurality of electronic devices include the first electronic device which is a high voltage load and the second electronic device which is a low voltage load.

The generating of the plurality of control signals includes reducing the output voltage of the first electronic device according to a predetermined rate, and increasing the output voltage of the second electronic device according to a predetermined voltage level.

The first electronic device includes an air conditioning heater, and the second electronic device includes at least one of a heating wire or an infrared warmer.

The generating of the plurality of control signals includes generating the plurality of control signals in response to a user's selection input or detection of peak power of the vehicle.

The vehicle further includes a battery configured to supply power to the plurality of electronic devices; and a BMS configured to monitor the power supplied from the battery, and the generating of the plurality of control signals includes reducing at least one of the output voltage of the first electronic device or the output voltage of the second electronic device in response to receiving a peak power signal from the BMS.

The control method further includes, when a first peak power signal, indicating that a first peak power is detected, and a second peak power signal, generated when a second peak power is detected after the first peak power signal, are received from the BMS, reducing, by the main control unit, at least one of the output voltage of the first electronic device or the output voltage of the second electronic device, according to a reduction control corresponding to the first peak power signal and a reduction control corresponding to the second peak power signal.

According to an embodiment of the disclosure, a non-transitory computer-readable recording medium storing a program for implementing a control method of a vehicle, wherein execution of the program stored in the non-transitory computer-readable recording medium causes a processor to: determining required power of a plurality of electronic devices based on input signals provided from a plurality of control units; and generating a plurality of control signals for changing at least one of output voltages of the plurality of electronic devices, based on the determined required power.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a diagram illustrating a result of high-voltage/low-voltage interlocking control of a vehicle according to an embodiment of the present disclosure;

FIG. 17 is a diagram illustrating an effect of high voltage peak power reduction of a vehicle according to an exemplary embodiment of the present disclosure.

DETAILED DESCRIPTION

Figure 1:
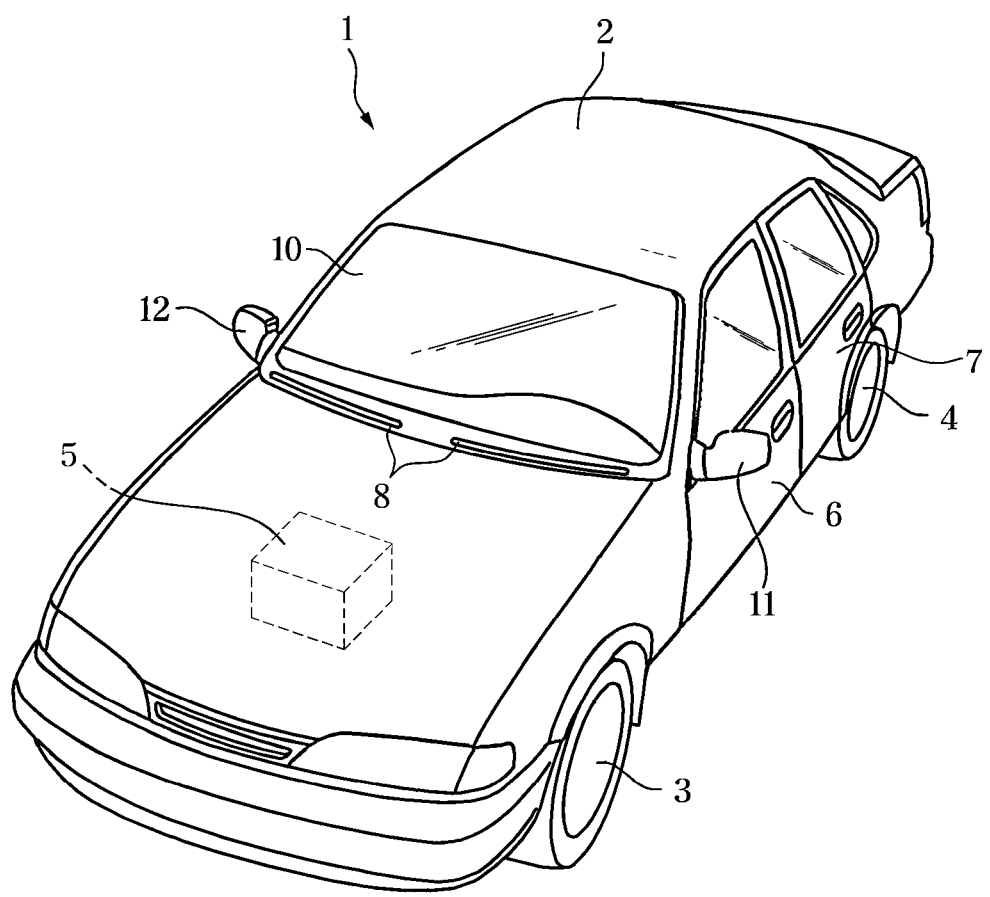
FIG. 1 illustrates a configuration of a vehicle according to an exemplary embodiment of the present disclosure.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~member", "~module", "~block", and the like may refer to at least one process processed by at least one hardware or software. According to embodiments, a plurality of "~part", "~member", "~module", "~block" may be embodied as a single element, or a single of "~part", "~member", "~module", "~block" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

Figure 2:
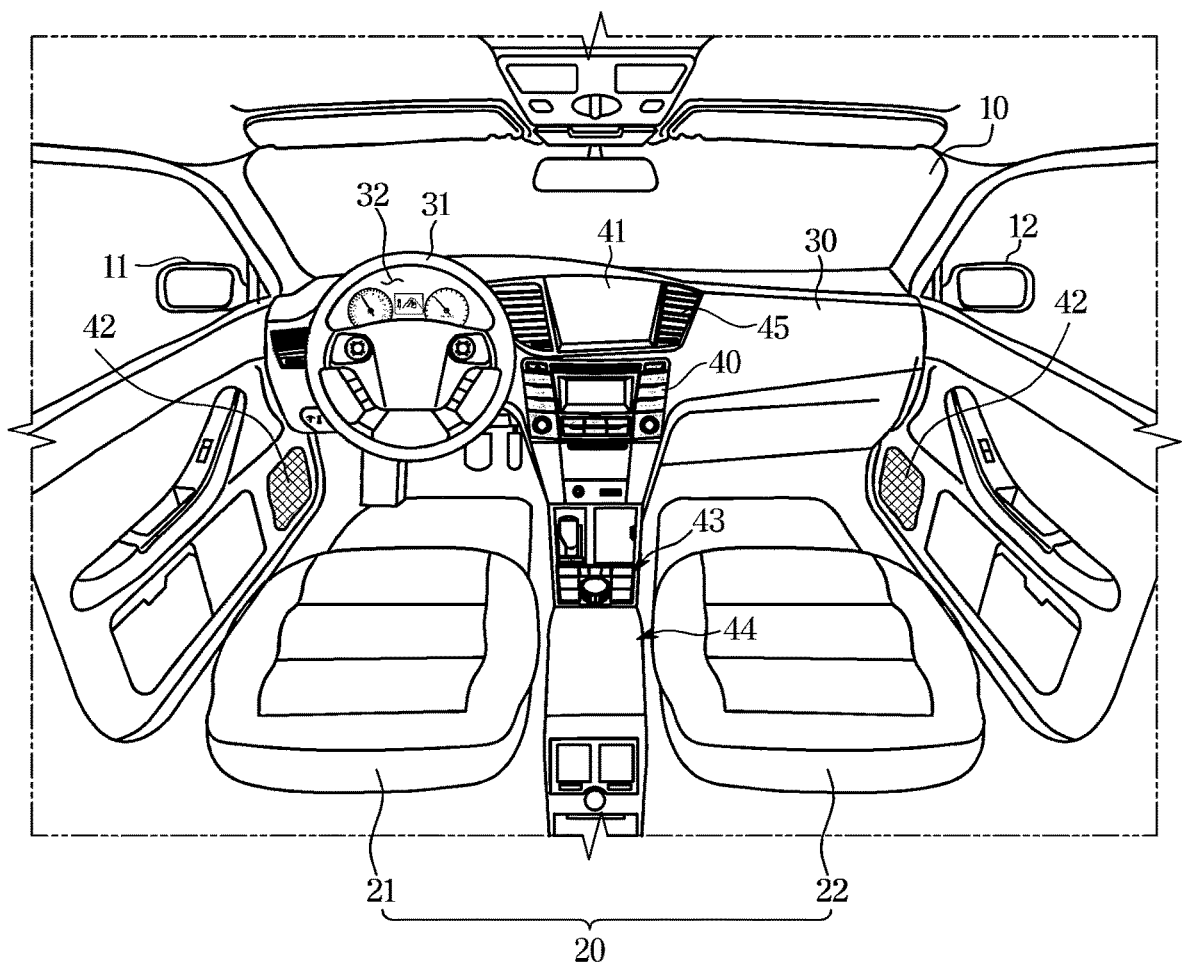
FIG. 2 illustrates an interior of a vehicle according to an exemplary embodiment of the present disclosure.

FIG. 1 illustrates a configuration of a vehicle according to an embodiment, and FIG. 2 illustrates an interior of a vehicle according to an exemplary embodiment of the present disclosure.

Referring to FIG. 1, a vehicle 1 includes a vehicle body 2 that defines an exterior of the vehicle 1, vehicle wheels 3 and 4 for moving the vehicle 1, a driving device 5 for rotating the vehicle wheels 3 and 4, doors 6 and 7 for shielding an inside of the vehicle 1 from an outside, a windshield 10 for providing a driver inside the vehicle 1 with a front field of view of the vehicle 1, and side mirrors 11 and 12 for providing the driver with a side field of view and a rear field of view.

The vehicle wheels 3 and 4 include front wheels 3 provided at a front side of the vehicle 1 and rear wheels 4 provided at a rear side of the vehicle 1. The driving device 5 provides a rotational force to the front wheels 3 or the rear wheels 4, so that the vehicle body 2 moves forward or backward. The driving device 5 may use an engine that generates a rotational force by burning fossil fuel or a motor that generates a rotational force by receiving power from a capacitor (not shown).

In addition to the driving device 5, the vehicle 1 includes a battery. The battery delivers electric energy to various electronic control units and hardware devices described below.

The doors 6 and 7 are rotatably provided on the left and right sides of the vehicle 1 so that the driver get in the vehicle 1 when opened. When closed, the inside of the vehicle 1 is shielded from the outside.

The windshield 10, that is, a windscreen, is provided on a front upper side of the vehicle 1 so that the driver inside the vehicle 1 may acquire visual information about the front of the vehicle 1. The windshield 10 may be provided with a wiper 8 for removing rain, snow or debris from the windshield 10.

The side mirrors 11 and 12 include the left side mirror 11 positioned on the left side of the vehicle 1 and the right side mirror 12 positioned on the right side of the vehicle 1. The side mirrors 11 and 12 may provide the driver inside the vehicle 1 with visual information about a field of view behind and to the side of the vehicle 1.

In addition, the vehicle 1 may include a variety of constituent components. That is, the vehicle 1 according to an embodiment of the disclosure includes a plurality of electronic control units (ECU) for operating the constituent components of the vehicle 1 and driver convenience. Hereinafter, an example of the ECU provided in the vehicle 1 and internal configuration of the vehicle body 2 are described with reference to FIG. 2.

FIG. 2 illustrates an interior of a vehicle according to an exemplary embodiment of the present disclosure.

Referring to FIG. 2, inside the vehicle 1, seats 20 on which occupants sit and a dashboard 30 provided with an input device for a driver on the seat 20 to control the vehicle 1 overall are included.

Specifically, the dashboard 30 may include an instrument panel (i.e., cluster) 31 including a tachometer, speedometer, coolant thermometer, fuel gauge, turn indicator, high beam indicator, warning light, seat belt warning light, odometer, shift lever indicator, door open warning light, engine oil warning light, and/or low oil warning light. Also, the dashboard 30 may include a steering wheel 32 for operating the vehicle wheels 3 and 4 and a center fascia 40 where an air vent 45 of an air conditioner, a display 41, and the like, are provided.

Here, the cluster 31 may be implemented digitally. That is, the digital cluster 31 receives and displays various information and driving information of the vehicle 1 from a plurality of ECUs.

The steering wheel 32 may be provided to be connected to the cluster 31 in a direction protruding toward a driver's seat 21 of the seats 20.

The steering wheel 32 is a device for controlling the vehicle wheels 3 and 4 and is connected to a steering device for adjusting a driving direction. For example, the steering device may employ a motor driven power steering (MDPS) method using a rotational force of a driving motor, and include an ECU for controlling the driving motor. A surface of the steering wheel 32 may be heated for a certain period of time by heating a heating wire underneath the surface according to a driver's intention, for driver convenience.

Also, an infrared warmer (not shown) may be provided to warm the driver's thighs and knees together with or in place of the air conditioning heater in winter, by installing an infrared heating device at a bottom of a column (connection part) of the steering wheel 32.

Further, the steering wheel 32 may include various input devices. For example, the steering wheel 32 may include a wiper switch (not shown) for controlling the wiper 8. The wiper switch (not shown) receives an input command and transmits a received signal to an ECU that controls a motor for operating the wiper 8. The ECU operates the motor connected to the wiper 8 based on the received command.

The center fascia 40 is positioned between the driver's seat 21 and a front passenger seat 22 in the dashboard 30, and may include various ECUs for controlling an audio video navigation (AVN) device, an air conditioning device, and the like. The ECUs may be controlled through a switch (not shown) receiving a user's input command.

The center fascia 40 may be provided with a variety of ECUs such as an AVN device. The AVN device refers to an ECU capable of integrally providing the user with a navigation function that provide a route to a destination, an audio function and a video function.

Also, the AVN device may output various images and sounds through a display 41 provided on the center fascia 40 and a speaker 42 provided inside the vehicle 1. The display 41 provided on the center fascia 40 may be implemented as a liquid crystal display (LCD), a light emitting diode (LED), a plasma display panel (PDP), an organic light emitting diode (OLED), cathode ray tube (CRT), and the like, without being limited thereto.

As another example, the center fascia 40 may be provided with the air vent 45 of the air conditioning device. The air conditioning device includes an ECU that controls an air conditioning environment including indoor/outdoor environmental conditions, air intake/exhaust, circulation, cooling/heating states, etc., automatically or in response to a user's control command. Such an air conditioning device discharges temperature-controlled air through the air vent 45.

The center fascia 40 may be provided with a center console 43, i.e., an input device capable of controlling various ECUs described above. The center console 43 is a device for receiving a command from an occupant inside the vehicle 1, and may include hardware devices such as various types of buttons or switches, pedal, keyboard, mouse, trackball, various levers, handle, stick, and the like. Also, the center console 43 may include a software device such as a graphical user interface (GUI) like a touch pad, or the like. The touch pad may be implemented as a touch screen panel (TSP) to form a layer structure with the display 41, or be provided independently of the center console 43.

Meanwhile, the center console 43 is connected to the plurality of ECUs described above, and transmits a received input command. For instance, the center console 43 transmits an input command to a head unit that collectively controls the plurality of ECUs of the vehicle 1 or the AVN device. Accordingly, the head unit, etc., transmits an input signal to the ECUs through a network in the vehicle 1, and an ECU corresponding to a destination of the input signal performs an operation according to the command.

In addition to the above, a tray 44 may be provided between the driver's seat 21 and the front passenger seat 22 inside the vehicle 1. The vehicle 1 may include other constituent components not described herein.

Also, the driver's seat 21 and the front passenger seat 22 may be heated for a certain period of time by heating a heating wire underneath the surface of the seats according to a driver's intention, for driver convenience.

Meanwhile, the plurality of ECUs provided inside and outside the vehicle 1 are connected through a network of the vehicle 1. That is, the plurality of ECUs may transmit/receive a signal through a communication network to exchange data.

A basic configuration of the vehicle 1 has been described above. Hereinafter, a main configuration for implementing a control method according to an exemplary embodiment of the disclosure and operations thereof are described in detail.

Figure 3:
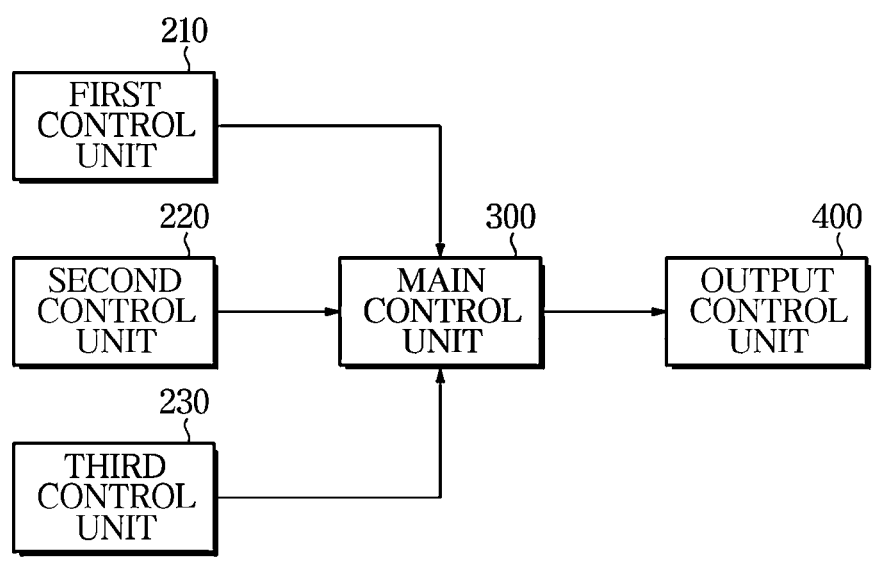
FIG. 3 is a control block diagram of a vehicle according to an exemplary embodiment of the present disclosure.

FIG. 3 is a control block diagram of a vehicle according to an exemplary embodiment of the present disclosure.

According to an embodiment, the vehicle 1 includes a plurality of control units 210, 220 and 230, a main control unit 300 and an output control unit 400. Each of the plurality of control units 210, 220 and 230, the main control unit 300 and the output control unit 400 may be implemented by a non-transitory memory storing, e.g., a program(s), software instructions reproducing algorithms, etc., which, when executed, performs various functions described hereinafter, and a processor (e.g., computer, microprocessor, CPU, ASIC, circuitry, logic circuits, etc.) configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s). The plurality of control units 210, 220 and 230 provided in the vehicle 1 are connected through a network in the vehicle 1. That is, the plurality of control units 210, 220 and 230 may transmit/receive a signal through a communication network to exchange data. For example, each of the plurality of control units 210, 220 and 230 may be a hardware device implemented by various electronic circuits, e.g., processor, transceiver, etc., to transmit and receive signals via wireless or wired connections.

According to an embodiment, the communication network may include a local interconnect network (LIN) method, control unit area network (CAN) method, and a pulse width modulation (PWM) method. The communication network operates according to a multi-master principle in which each of a plurality of ECUs performs a master function in a master/slave system.

The network operates according to a multi-master principle. The multi-master principle refers to a multiple communication rather than point-to-point communication, and also refers to a system in which each of a plurality of nodes is connected to each other, rather than being connected through one central node.

According to the multi-master principle, the plurality of control units 210, 220 and 230 inside the vehicle 1 may share information. That is, each of the control units 210, 220 and 230 may be a master functioning as a messenger, and thus an ECU may change a message to be transmitted and transmit the changed message to another ECU. The other ECU receiving the changed message may also change data included in the message again.

For example, the plurality of control units 210, 220 and 230 may transmit a message through the main control unit 300 which is a master, and the main control unit 300 may transmit a changed message to the output control unit 400. A signal transmission process is described in detail with reference to FIG. 6 below.

Meanwhile, the vehicle 1 is equipped with a variety of electronic devices to provide various functions in addition to a basic function such as driving. In this instance, the electronic device is a load that consumes power, and may be divided into a high voltage load and a low voltage load. For example, the high voltage load, which may require a higher operation voltage than the low voltage load, includes an electric compressor, an air conditioning heater, and the like, and the low voltage load, which may require a lower operation voltage than the high voltage, includes a seat heating device, seat ventilation device, cooling fan, and the like.

Further, when a user desires to increase energy efficiency as required, by inputting a command for a switch provided on a center fascia, the plurality of control units 210, 220 and 230 individually control the high voltage load and the low voltage load through individual control signals. However, the above-described uniform power restriction limits various functions being performed (e.g., air conditioning device), and prevents an increase in driving range.

According to an exemplary embodiment of the disclosure, based on a correlation between the high voltage load and the low voltage load, an associated control is performed to maintain an original function level and to increase a driving range without individually controlling the high voltage load and the low voltage load. The associated control logic is described in detail with reference to FIGS. 4 to 12.

Figure 4:
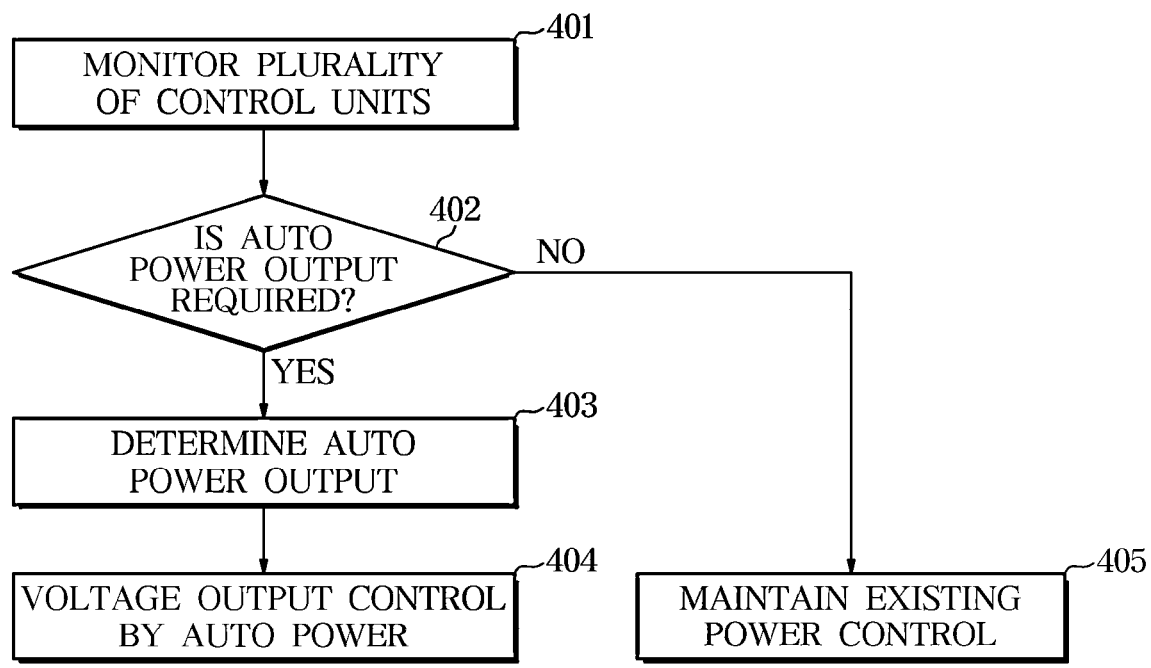
FIG. 4 is a flowchart illustrating a control method of a vehicle according to an exemplary embodiment of the present disclosure.

FIG. 4 is a flowchart illustrating a control method of a vehicle according to an exemplary embodiment of the present disclosure.

The vehicle 1 monitors a plurality of control units (401). In this instance, the plurality of control units control power output from each electronic device (not shown) by providing control signals to both a high voltage load and a low voltage load. Each of the electronic devices is provided in the vehicle 1 to perform a separate function. The electronic devices include the high voltage load including an electric compressor, an air conditioning heater, and the like, and the low voltage load including a seat heating device, seat ventilation device, cooling fan, and the like.

The vehicle 1 determines whether an auto power output is required (402). When the auto power output is required, the vehicle 1 determines the auto power output (403). Here, the auto power output is to minimize power consumption of a battery (not shown) according to a user's selection command or internal control logic. The auto power output may be selectively operated according to the user's needs. For example, the user may select an eco mode through a switch (not shown) provided on a center fascia to minimize battery consumption or fuel consumption. Also, the vehicle 1 may automatically determine the auto power output to minimize power consumption when peak power occurs.

When the auto power output is determined, the vehicle 1 may perform a voltage output control by auto power (404). A control process in operation 404 is described in detail with reference to FIGS. 5 to 8 below.

By contrast, when a selection command on the auto power output does not exist or the auto power output is not required, the vehicle 1 maintains an existing power control (405).

Figure 5:
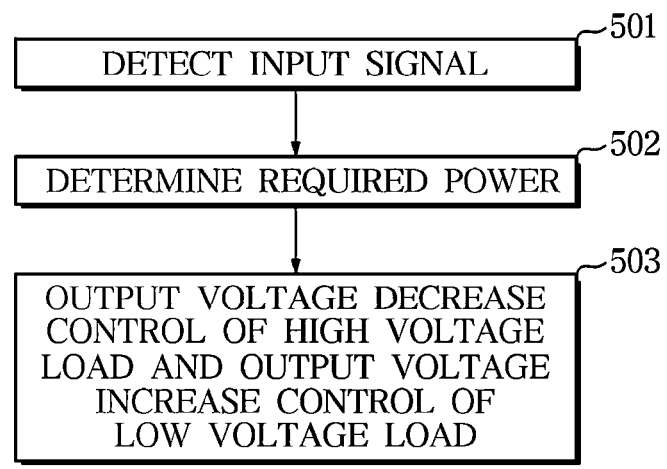
FIG. 5 is a flowchart illustrating a high-voltage/low-voltage interlocking control method of a vehicle according to an exemplary embodiment of the present disclosure.
Figure 6:
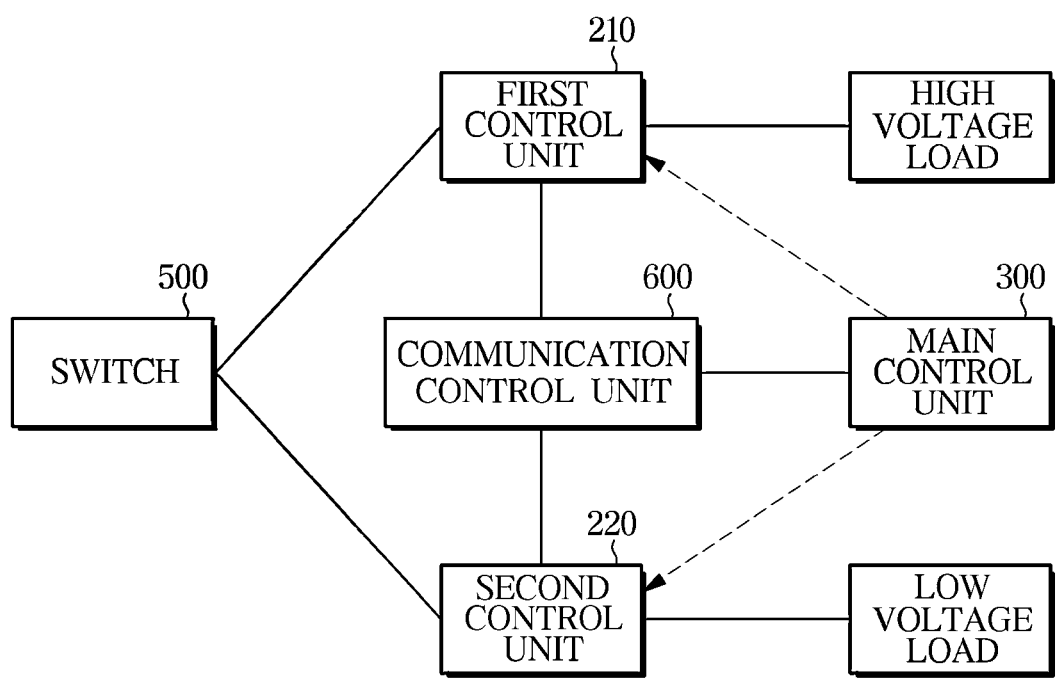
FIG. 6 is a diagram illustrating a signal transmission among constituent components of a vehicle according to an exemplary embodiment of the present disclosure.
Figure 8:
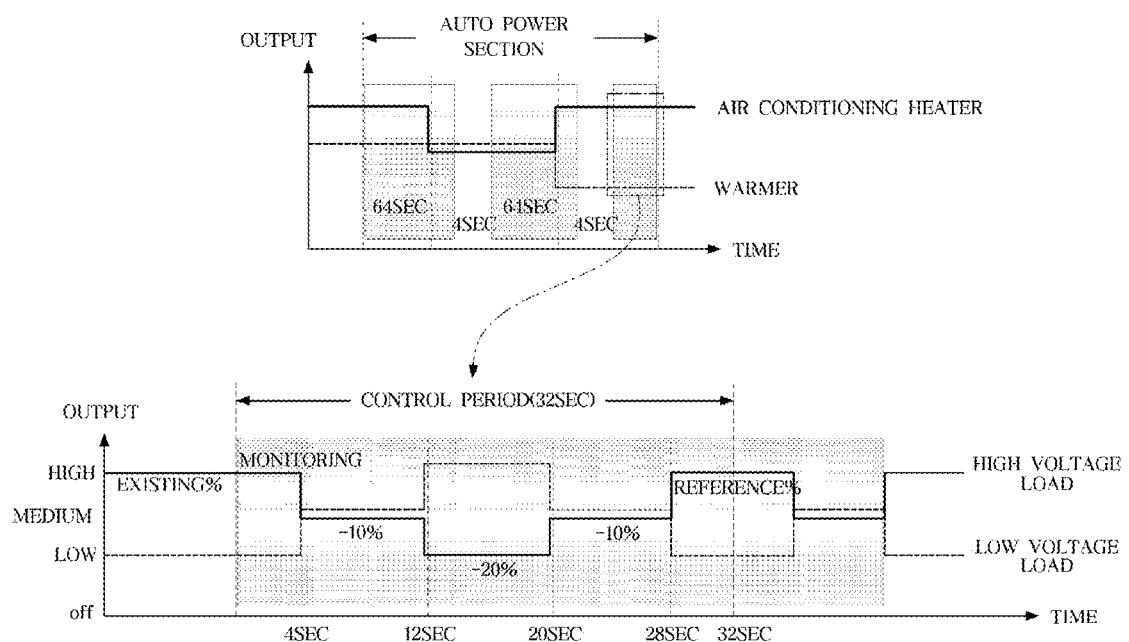
FIG. 8 is a diagram illustrating a correlation of outputs between a high voltage load and a low voltage load of a vehicle according to an exemplary embodiment of the present disclosure.

FIG. 5 is a flowchart illustrating a high-voltage/low-voltage interlocking control method of a vehicle according to an exemplary embodiment of the present disclosure. FIG. 6 is a diagram illustrating a signal transmission among constituent components of a vehicle according to an exemplary embodiment of the present disclosure. FIG. 7 is a diagram illustrating a result of high-voltage/low-voltage interlocking control of a vehicle according to an embodiment. FIG. 8 is a diagram illustrating a correlation of outputs between a high voltage load and a low voltage load of a vehicle according to an exemplary embodiment of the present disclosure. The flowchart of FIG. 5 is described with reference to FIGS. 6 and 8.

Referring to FIG. 5, the main control unit 300 detects an input signal from the plurality of control units 210, 220 and 230 (501). The input signal is information about an electronic device controlled by each of the plurality of control units 210, 220 and 230, and includes switch information according to a user's selection, an electronic device ID, required power of an electronic device, and the like.

Referring to FIG. 6, the first control unit 210 and the second control unit 220 receive the switch information from a switch 500. For example, the first control unit 210 and the second control unit 220 acquire the switch information to determine an electronic device activated by the switch 500 provided on a center fascia. In this instance, at least one of the first control unit 210 or the second control unit 220 may be configured in an integrated structure with the switch 500. When only one of the first control unit 210 or the second control unit 220 is connected, the switch information may be transmitted to the main control unit 300 by further including a communication control unit 600. The first control unit 210 and the second control unit 220 may transmit a control signal to a high voltage load and a low voltage load based on the received switch information to control a voltage supplied to a corresponding electronic device. The communication control unit 600 may be a hardware device implemented by various electronic circuits, e.g., processor, transceiver, etc., to transmit and receive signals via wireless or wired connections.

The main control unit 300 determines required power of the electronic device (502). Through the above, the main control unit 300 may transmit a message about the required power to the output control unit 400 to control power supplied to the electronic device. Also, the main control unit 300 may control the power supplied to the electronic device based on the required power.

The main control unit 300 performs an output voltage decrease control of the high voltage load and an output voltage increase control of the low voltage load (503). Changing the output voltage for the high voltage load and the low voltage load is performed in association with each other, and thus power consumption may be reduced by lowering the output voltage of the high voltage load that consumes a relatively large amount of power.

According to an embodiment, the main control unit 300 may change at least one of an output voltage of a first electronic device, which is the high voltage load, or an output voltage of a second electronic device, which is the low voltage load. In this instance, the main control unit 300 may reduce the output voltage of the first electronic device and increase the output voltage of the second electronic device. In this instance, the first and second electronic devices perform similar functions, for example, the first electronic device may be an air conditioning heater, and the second electronic device may be at least one of a heating wire or an infrared warmer. By lowering an output voltage of the air conditioning heater that uses a relatively high voltage and increasing an output voltage of the heating wire and the infrared warmer that use a low voltage compared to the air conditioning heater, the power consumption may be reduced while maintaining a heating performance of the vehicle.

In this instance, the output voltage of the first electronic device may be reduced according to a predetermined rate. For example, the output voltage of the first electronic device may be reduced by 10% to 20% of the output voltage of the first electronic device based on a required voltage. Also, the output voltage of the second electronic device may be increased according to a predetermined voltage level. When the second electronic device is a heating wire, the heating wire may be heated in three voltage levels. In this instance, when the heating wire is operated at a first voltage level, the main control unit 300 may increase the voltage level of the heating wire to a second or third voltage level.

In FIG. 7, a result of interlocking control between the voltage supplied to the high voltage load and the voltage supplied to the low voltage load may be confirmed. For example, in a first control, when an output voltage of the high voltage load is controlled to be 70% and a level of an output voltage of the low voltage load is controlled to be a low voltage level, a fuel efficiency improvement effect is insignificant. Next, in a second control, when the output voltage of the high voltage load is controlled to be 50% and the output level of the low voltage load is controlled to be a medium voltage level, the fuel efficiency improvement effect is moderate. Last, in a third control, when the output voltage of the high voltage load is controlled to be 30% and the output level of the low voltage load is controlled to be a high voltage level, the fuel efficiency improvement effect is significantly increased. When the high voltage load is the air conditioning heater and the low voltage load is the heating wire, a driving range of the vehicle may be increased by improving fuel efficiency while maintaining a heating effect the same.

Referring to FIG. 8, when an auto power mode is on, an interlocking control between the high voltage load and the low voltage load may be performed for a predetermined period. In this instance, the output voltage of the high voltage load may be reduced in stages and the output voltage of the low voltage load may be reduced in stages within the predetermined period.

Unlike FIG. 8, the output voltage of each of the high voltage load and the low voltage load may be controlled by a one-time increase/decrease without increasing/decreasing the output voltage in stages. In this instance, a degree of increase/decrease may be determined according to a degree to which fuel efficiency improvement is required, which may be determined according to a user's selection command or a driving range of the vehicle 1.

Meanwhile, results of interlocking control between the air conditioning heater, which is the high voltage load, and the infrared warmer, which is the low voltage load, according to an auto power, may be confirmed in FIGS. 9 to 12.

Figure 9:
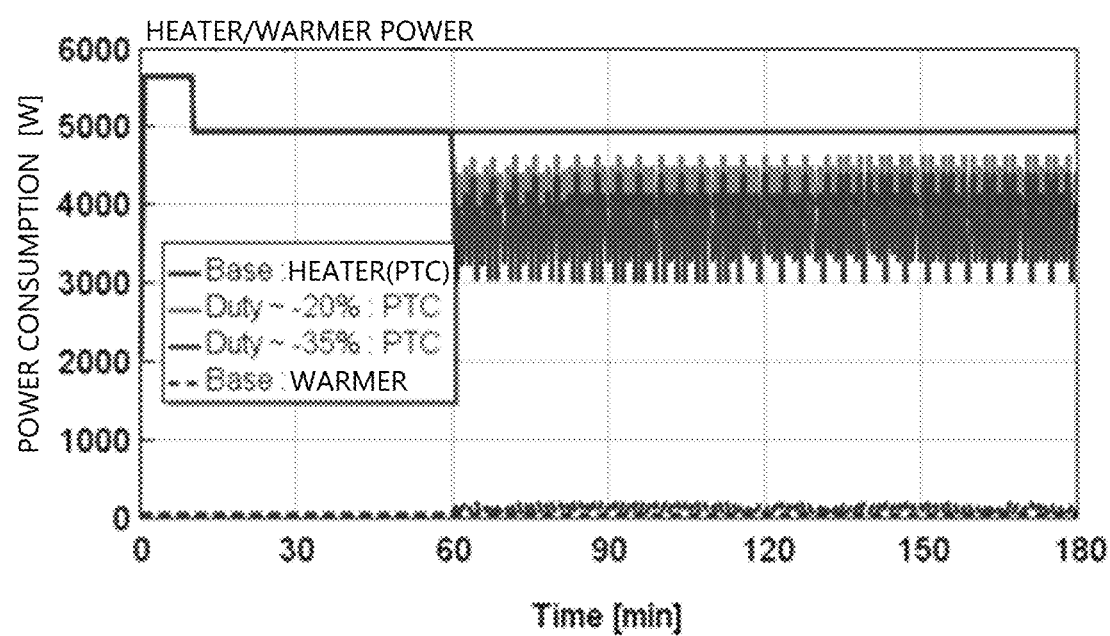
FIGS. 9, 10, 11 and 12 are diagrams illustrating experimental effects of a control method of a vehicle according to an exemplary embodiment of the present disclosure.
Figure 10:
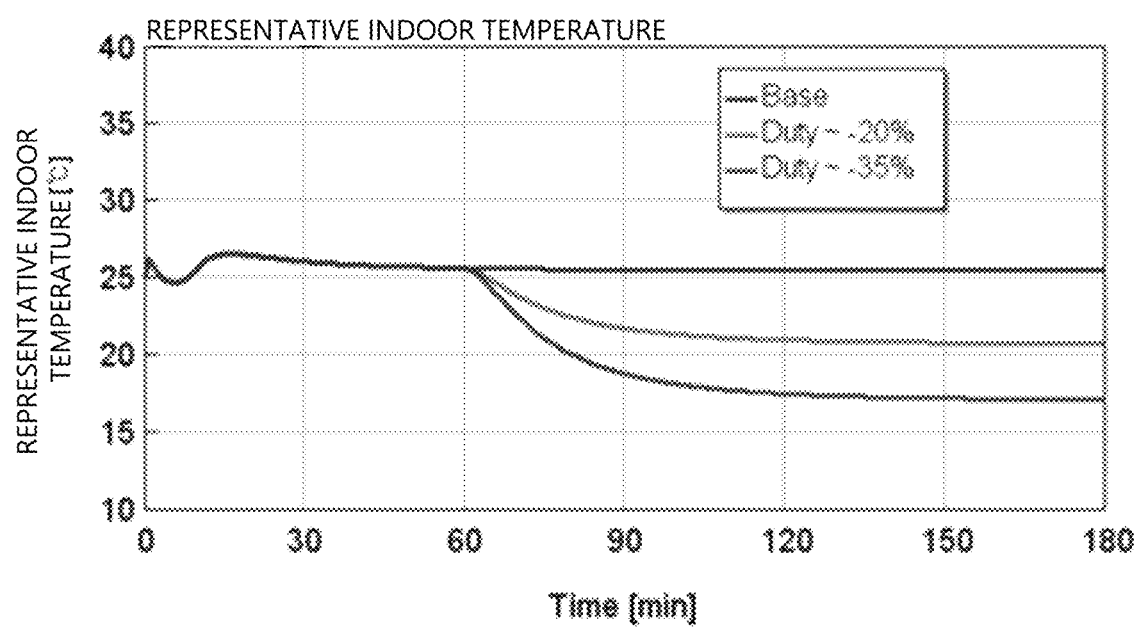
Figure 11:
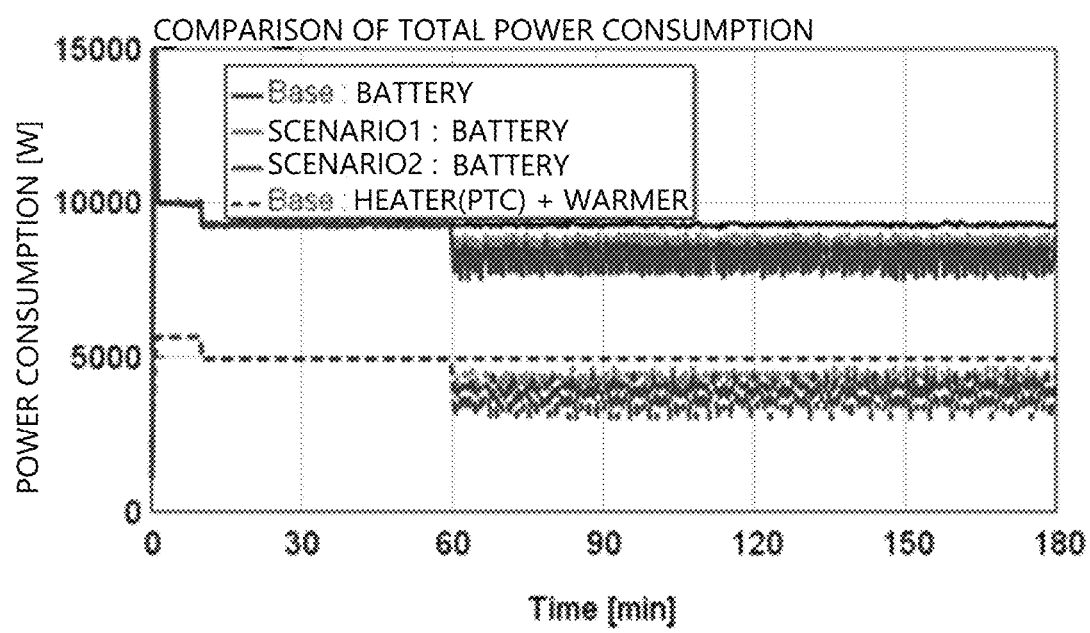
Figure 12:
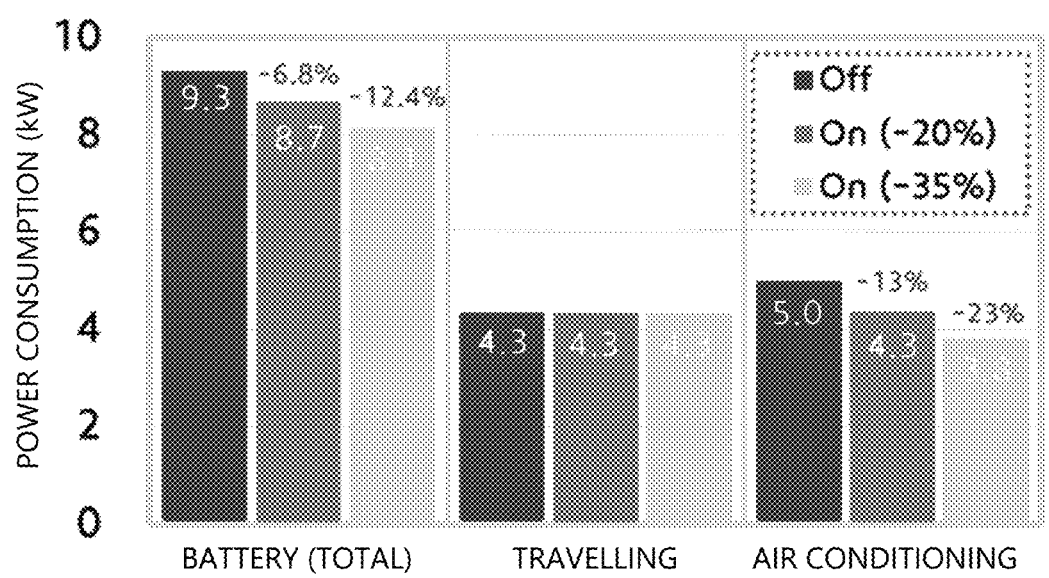

It may be seen in FIG. 9 that the interlocking control according to an exemplary embodiment of the present disclosure is performed after 60 minutes have elapsed. It may be confirmed in FIG. 10 that an indoor temperature does not drastically change despite a decrease in total power consumption. In this instance, as shown in FIG. 11, it may be confirmed that the total power consumption by the air conditioning heater and the infrared warmer is reduced after the interlocking control starts. It may be seen in FIG. 12 that a power consumption of an entire battery is reduced. When the power consumption by the air conditioning heater and the infrared warmer is reduced by 13% to 23%, the total power consumption of the vehicle 1 may be reduced by 7% to 12%.

Meanwhile, according to the disclosure, in addition to the interlocking control between the high voltage load and the low voltage load, when high voltage peak power is generated, the power consumption may be saved by reducing an output voltage of a subject load. The peak power indicates an abnormal state in which total power consumption of the vehicle 1 exceeds a reference value, and a battery performance may be deteriorated by the peak power, which may be a difference between the total power consumption of the vehicle 1 and the reference value.

Conventionally, a method of simply reducing an output voltage of a subject load is used without detecting the high voltage peak power. However, such a control logic may deteriorate a performance of an electronic device. According to the disclosure, a selective control may be performed only when peak power is generated by monitoring a battery using a battery management system (BMS).

Figure 13:
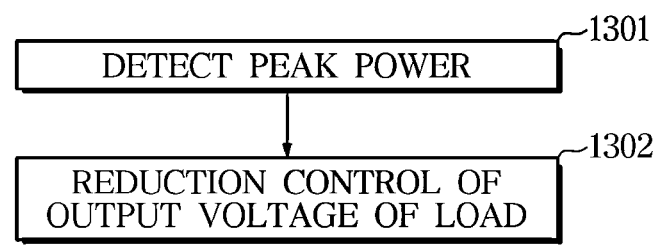
FIG. 13 is a flowchart illustrating a control method for high voltage peak power reduction of a vehicle according to an exemplary embodiment of the present disclosure.
Figure 14:
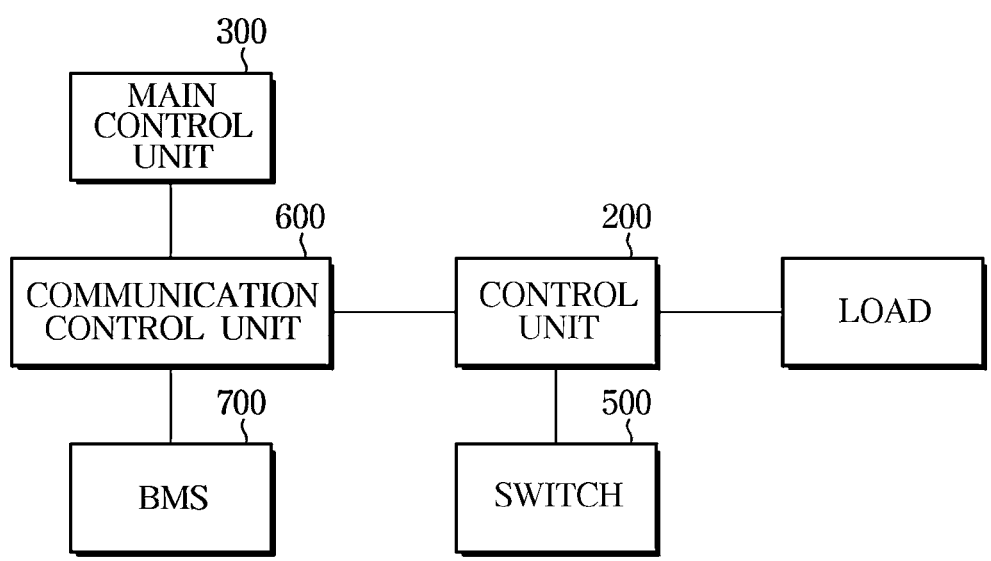
FIG. 14 is a diagram illustrating a signal transmission among constituent components of a vehicle according to an exemplary embodiment of the present disclosure.
Figure 15:
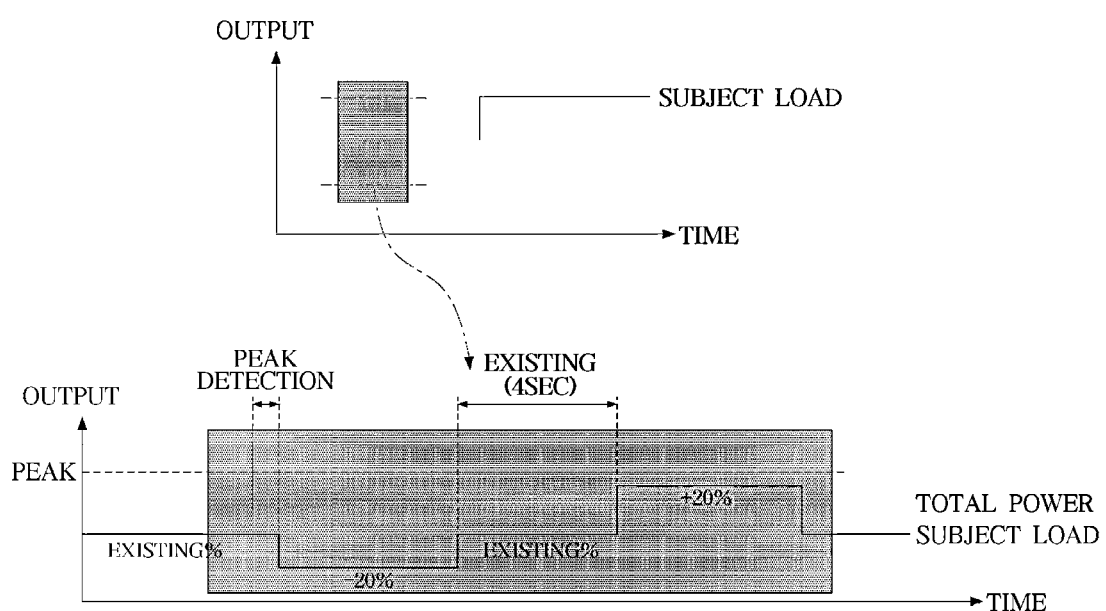
FIG. 15 is a diagram illustrating a process of high voltage peak power reduction of a vehicle according to an exemplary embodiment of the present disclosure.
Figure 16:
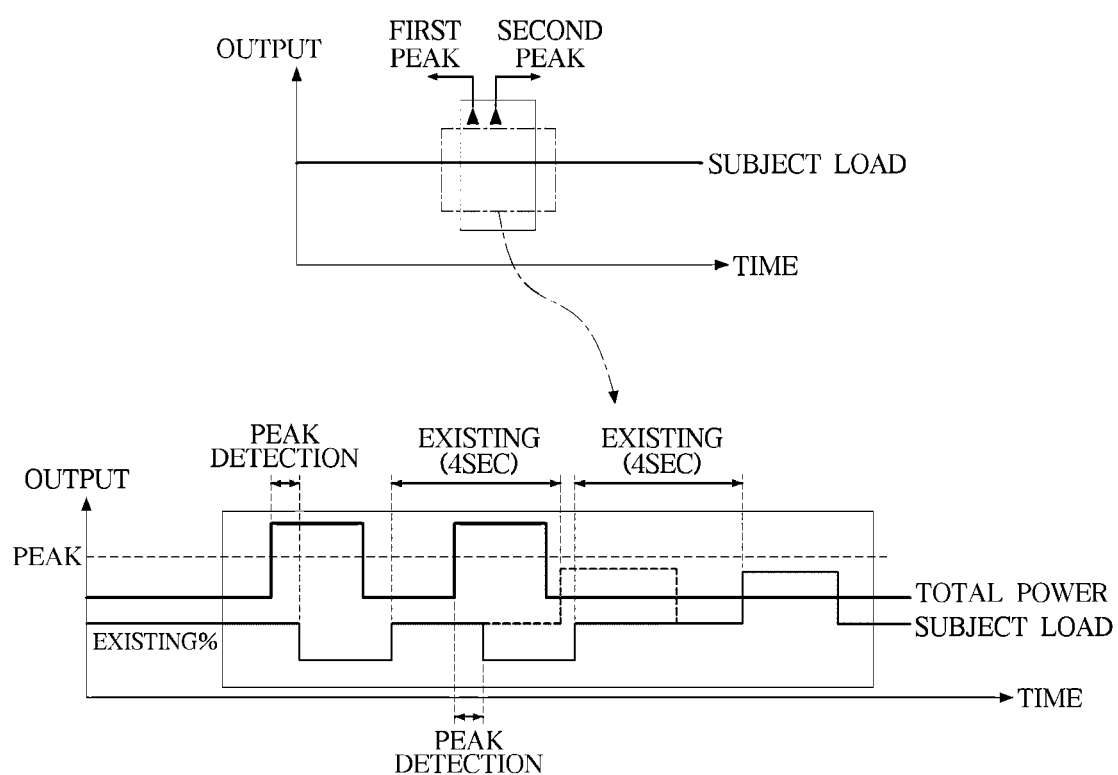
FIG. 16 is a diagram illustrating a process of high voltage peak power reduction of a vehicle according to another exemplary embodiment of the present disclosure.

FIG. 13 is a flowchart illustrating a control method for high voltage peak power reduction of a vehicle according to an exemplary embodiment of the present disclosure. FIG. 14 is a diagram illustrating a signal transmission among constituent components of a vehicle according to an exemplary embodiment of the present disclosure. FIG. 15 is a diagram illustrating a process of high voltage peak power reduction of a vehicle according to an exemplary embodiment of the present disclosure. FIG. 16 is a diagram illustrating a process of high voltage peak power reduction of a vehicle according to another exemplary embodiment of the present disclosure.

The main control unit 300 detects a peak power (1301). In this instance, the peak power is generated by total power consumed by a battery (not shown), and may be detected while being monitored by a BMS 700. Referring to FIG. 14, in the configuration according to the embodiment, the signal transmission process of FIG. 6 may be used and the BMS 700 for detecting the peak power generated by the total power output from the battery is further included.

When the peak power is detected, the main control unit 300 performs a reduction control of an output voltage of a load (1302). The reduction control process is described in detail with reference to FIGS. 15 and 16.

Referring to FIG. 15, when the peak power is detected in an auto power control section, an output voltage of a subject load is reduced by 20%, compared to an existing output voltage. In this instance, the main control unit 300 reduces the output voltage of the subject load in response to receiving a peak power signal which is generated when the peak power of the vehicle 1 is detected. In this instance, a timing of reducing the output voltage may be after a predetermined time has elapsed. When the peak power is not detected after reducing the output voltage of the subject load by a predetermined rate, the main control unit 300 restores the output voltage of the subject load to an original value. Afterwards, when the peak power is not continuously detected, the main control unit 300 increases the output voltage of the subject load by 20%, compared to a previous output voltage, thereby improving the output of the subject load. In this instance, the subject load may be one of a first electronic device which is a high voltage load or a second electronic device which is a low voltage load.

FIG. 16 illustrates a reduction control when peak power is detected more than twice. For example, when a first peak power signal, which is generated when a first peak power is detected, and a second peak power signal, which is generated when a second peak power is detected after the first peak power signal, are received from the BMS 700, the main control unit 300 performs a reduction control corresponding to the second peak power signal. Although output power of a subject load is adjusted in an order of −20%, 0% and +20% in the reduction control in FIG. 15, a reduction control is performed according to a predetermined rate after a predetermined period of time based on the second peak power signal in an embodiment of FIG. 16. Specifically, according to the embodiment, an output voltage is reduced by the predetermined rate after detecting a first peak power, and then when a second peak power is detected after returning to an existing output voltage, the output voltage is reduced again by the predetermined rate. Afterwards, when the peak power is not detected for a predetermined period of time, the output voltage of the subject load may be returned to the existing output voltage and increased by the predetermined rate. Accordingly, the output voltage of the subject load may be controlled based on a final peak power.

FIG. 17 is a diagram illustrating an effect of high voltage peak power reduction of a vehicle according to an exemplary embodiment of the present disclosure.

When the vehicle 1 may be driven by a driving motor, an electric power demand by the driving motor accounts for a large proportion. In this instance, when peak power is generated by the driving motor, the above-described reduction control may be performed with respect to a subject load (a high voltage load or a low voltage load) to stabilize total power consumed by a battery to a desired power. In addition, deterioration of battery performance may be prevented.

As is apparent from the above, according to the embodiments of the disclosure, the vehicle and the control method thereof can improve fuel efficiency of the vehicle by integrally managing a plurality of electronic control units for controlling a high voltage load and a low voltage load.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:
  a plurality of electronic devices comprising a first electronic device and a second electronic device;
  a plurality of control units configured to control power supplied to the plurality of electronic devices; and
  a main control unit configured to provide a plurality of control signals to the plurality of control units,
  wherein the main control unit is further configured to determine required power of the plurality of electronic devices based on input signals provided from the plurality of control units and to generate the plurality of control signals for changing at least one of an output voltage of the first electronic device or an output voltage of the second electronic device, based on the determined required power,
  wherein the main control unit is further configured to:
  reduce the output voltage of the first electronic device, having a relatively high voltage load among the plurality of electronic devices, based on a reduction rate determined by a remaining driving range of the vehicle, and
  increase the output voltage of the second electronic device, having a relatively low voltage load among the plurality of electronic devices, based on an increase level determined by the remaining driving range of the vehicle.

2. The vehicle of claim 1, wherein the first electronic device comprises an air conditioning heater, and the second electronic device comprises at least one of a heating wire or an infrared warmer.

3. The vehicle of claim 1, wherein the main control unit is further configured to generate the plurality of control signals in response to a user's selection input or detection of peak power of the vehicle.

4. The vehicle of claim 1, further comprising:
a battery configured to supply power to the plurality of electronic devices; and
a battery management system (BMS) configured to monitor the power supplied from the battery,
wherein the main control unit is further configured to reduce at least one of the output voltage of the first electronic device or the output voltage of the second electronic device in response to receiving a peak power signal from the BMS.

5. The vehicle of claim 4, wherein, when a first peak power signal, indicating that a first peak power is detected, and a second peak power signal, generated when a second peak power is detected after the first peak power signal, are received from the BMS, the main control unit is further configured to reduce at least one of the output voltage of the first electronic device or the output voltage of the second electronic device based on a reduction control corresponding to the first peak power signal and a reduction control corresponding to the second peak power signal.

6. A control method of a vehicle comprising a plurality of electronic devices comprising a first electronic device and a second electronic device, a plurality of control units configured to control power supplied to the plurality of electronic devices, and a main control unit configured to provide a plurality of control signals to the plurality of control units, the control method comprising:
determining, by the main control unit, required power of the plurality of electronic devices based on input signals provided from the plurality of control units; and
generating, by the main control unit, the plurality of control signals for changing at least one of an output voltage of the first electronic device or an output voltage of the second electronic device, based on the determined required power,
wherein the generating of the plurality of control signals comprises:
reducing the output voltage of the first electronic device, having a relatively high voltage load among the plurality of electronic devices, based on a reduction rate determined by a remaining driving range of the vehicle; and
increasing the output voltage of the second electronic device, having a relatively low voltage load among the plurality of electronic devices, based on an increase level determined by the remaining driving range of the vehicle.

7. The control method of claim 6, wherein the first electronic device comprises an air conditioning heater, and the second electronic device comprises at least one of a heating wire or an infrared warmer.

8. The control method of claim 6, wherein the generating of the plurality of control signals further comprises generating the plurality of control signals in response to a user's selection input or detection of peak power of the vehicle.

9. The control method of claim 6, wherein the vehicle further comprises a battery configured to supply power to the plurality of electronic devices; and a BMS configured to monitor the power supplied from the battery, and
the generating of the plurality of control signals further comprises reducing at least one of the output voltage of the first electronic device or the output voltage of the second electronic device in response to receiving a peak power signal from the BMS.

10. The control method of claim 9, further comprising:
when a first peak power signal, indicating a first peak power is detected, and a second peak power signal, generated when a second peak power is detected after the first peak power signal, are received from the BMS, reducing, by the main control unit, at least one of the output voltage of the first electronic device or the output voltage of the second electronic device, based on a reduction control corresponding to the first peak power signal and a reduction control corresponding to the second peak power signal.

11. A non-transitory computer-readable recording medium storing a program for implementing a control method of a vehicle, wherein execution of the program stored in the non-transitory computer-readable recording medium causes a processor to:
determine required power of a plurality of electronic devices based on input signals provided from a plurality of control units, the plurality of electronic devices comprising a first electronic device and a second electronic device;
generate a plurality of control signals for changing at least one of an output voltage of the first electronic device or an output voltage of the second electronic device, based on the determined required power;
reduce the output voltage of the first electronic device, having a relatively high voltage load among the plurality of electronic devices, based on a reduction rate determined by a remaining driving range of the vehicle, and
increase the output voltage of the second electronic device, having a relatively low voltage load among the plurality of electronic devices, based on an increase level determined by the remaining driving range of the vehicle.

* * * * *